July 5, 1966   J. C. HAMAKER, JR., ET AL   3,259,489
ULTRA HARD HIGH SPEED STEEL
Filed June 3, 1963   2 Sheets-Sheet 1
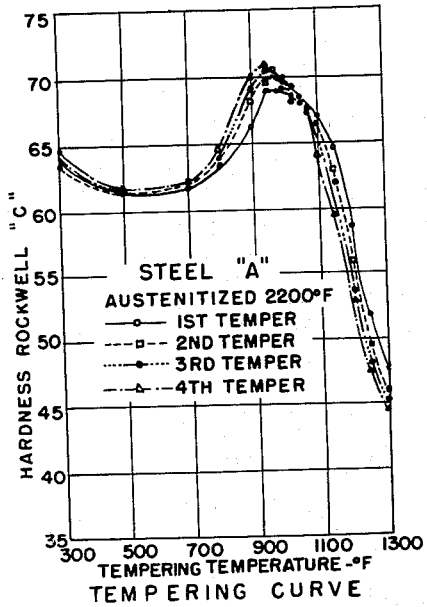
FIG. 1 — TEMPERING CURVE
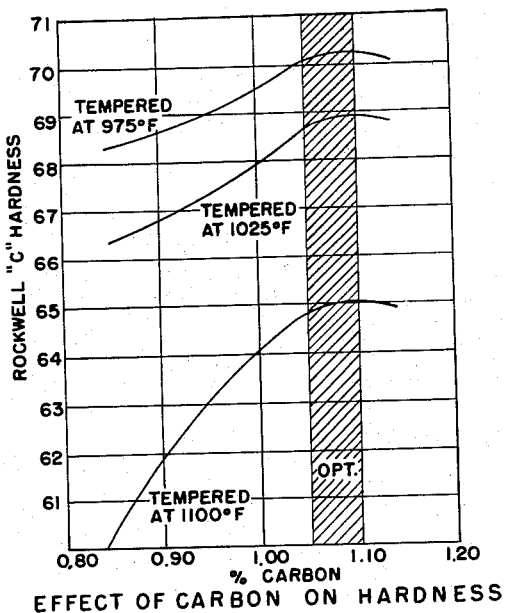
FIG. 2 — EFFECT OF CARBON ON HARDNESS
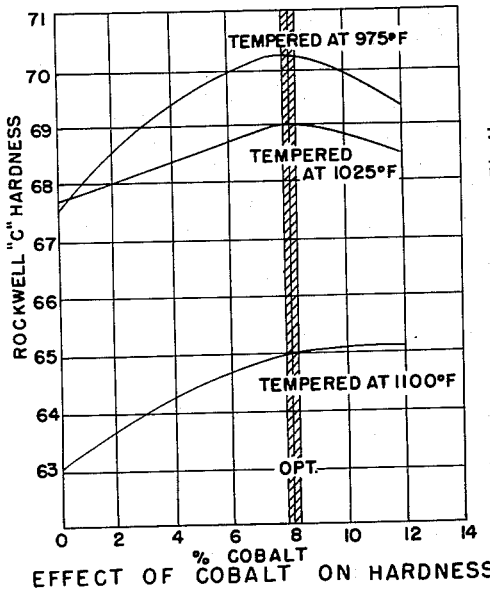
FIG. 3 — EFFECT OF COBALT ON HARDNESS
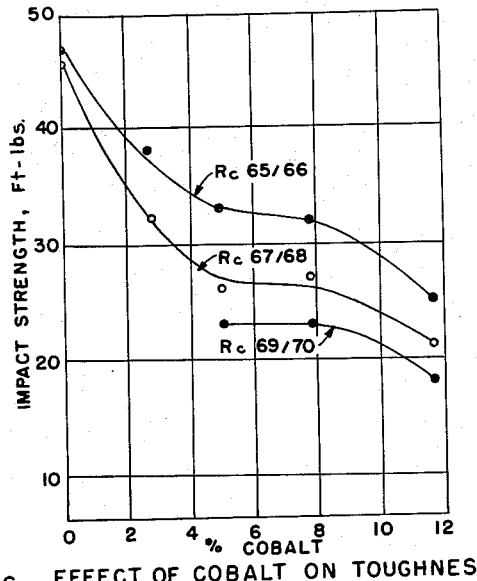
FIG. 4 — EFFECT OF COBALT ON TOUGHNESS
INVENTORS:
JOHN C. HAMAKER, JR.
JAMES R. HANDYSIDE
DANIEL H. YATES
BY Marzall, Johnston, Cook & Root
ATT'YS July 5, 1966  J. C. HAMAKER, JR., ET AL  3,259,489
ULTRA HARD HIGH SPEED STEEL
Filed June 3, 1963  2 Sheets-Sheet 2

EFFECT OF MOLYBDENUM AND TUNGSTEN ON TOUGHNESS

RELATIONSHIP OF TOUGHNESS VERSUS HARDNESS

COMPARATIVE TOOL LIFE (END MILLING)

INVENTORS:
JOHN C. HAMAKER, JR.
JAMES R. HANDYSIDE
DANIEL H. YATES
BY
ATT'YS

United States Patent Office 3,259,489
Patented July 5, 1966

3,259,489
ULTRA HARD HIGH SPEED STEEL
John C. Hamaker, Jr., Latrobe, James R. Handyside, Monroeville, and Daniel H. Yates, Latrobe, Pa., assignors to Vasco Metals Corporation, a corporation of Pennsylvania
Filed June 3, 1963, Ser. No. 285,115
10 Claims. (Cl. 75—126)

This invention relates to an ultra hard high speed steel and to a method for its manufacture.

High speed steel development has often been characterized by rather dramatic composition and property changes. The original 18% W—4% Cr—1% V (T1) analysis, which dominated the field for some thirty years, appeared in 1910 as an outgrowth of Mushet's and Taylor's pioneer discoveries. Five, eight, and twelve percent cobalt additions, for increased hot hardness, were introduced in the 1920's. The molybdenum high speed steels (M2, M1, M10), studied in the 1930's, were used extensively during World War II, and subsequently became the dominant types. They were based on the discovery that one atom of molybdenum could be substituted for one atom of tungsten (corresponding to about ½ weight percent molybdenum for 1 weight percent tungsten), and result in quite similar cutting properties. Also of significance during this era was J. P. Gill's development of the high vanadium, extremely wear resistant high speed steels (T15, M15, M4) (U.S. Patents 2,174,281, 2,174,282, 2,174,283, 2,174,284, 2,174,285, 2,174,286). Containing nearly twice as much carbon as the standard grades, they increased wear resistance by a factor of 6, and raised hot hardness, while retaining good toughness. Finally, during the 1950's, the free machining high speed steels, containing sulfur additions of 0.10% to 0.15%, provided easier manufacture for certain tool designs.

As aircraft, missile, and related industries began machining higher and higher strength materials (such as 4340, VascoJet 1000, D6AC, and 300-M heat treated to 45–56 Rockwell "C"), as well as stronger heat resisting superalloys, it became apparent that a harder high speed steel was needed, that would still retain sufficient toughness and edge strength to permit positive rake angles. Such a steel could supplement the high vanadium T15, M15, and M4 types which were performing well on the intermediate hardness and strongly work hardening materials.

One of the objects of the present invention is to provide an ultra hard high speed steel which has a hardness of 69–70 Rockwell "C" and can be used successfully for the manufacture of tools for cutting heat treated aircraft steels and heat resistant jet engine alloys.

A further object of the invention is to provide a new and improved steel which exhibits toughness that is exceptionally high for its hardening ability, grindability approaching that of standard high speed steels and hot hardness and resistance to softening surpassing other grades of steels.

Other objects and advantages of the invention will appear from the following description in conjunction with the accompanying drawings in which FIGURE 1 shows the tempering curve of a steel of the invention herein referred to as "Steel A";

FIGURE 2 shows the effect of carbon on hardness in the manufacture of Steel A;

FIGURE 3 shows the effect of cobalt on hardness in the manufacture of Steel A;

FIGURE 4 shows the effect of cobalt on toughness in the manufacture of Steel A;

Figure 5:
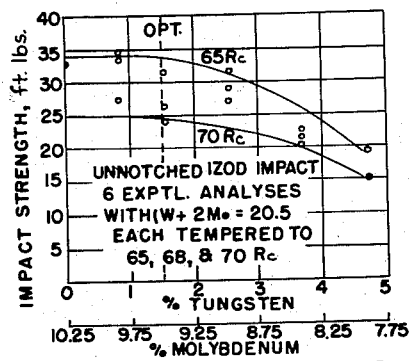
FIGURE 5 shows the effect of molybdenum and tungsten on toughness in the manufacture of Steel A.

In accordance with the invention it has been found that a new ultra hard high speed steel can be made having the chemical composition shown in the following table.

Table I

|  | General Range, Percent by Weight | Preferred Range, Percent by Weight | Steel "A" Percent by Weight |
|---|---|---|---|
| Carbon | 1.00–1.20 | 1.07–1.13 | 1.09 |
| Silicon | 0–1.00 | 0–0.5 | .25 |
| Manganese | 0–1.00 | 0–0.5 | .25 |
| Sulfur | 0–0.25 | 0–0.15 | .027 |
| Phosphorus | 0–0.25 | 0–0.15 | .018 |
| Tungsten | 1.00–2.00 | 1.25–1.75 | 1.45 |
| Chromium | 3.00–5.00 | 3.25–4.25 | 3.86 |
| Vanadium | 0.75–1.50 | 1.00–1.30 | 1.17 |
| Molybdenum | 8.50–10.50 | 9.00–10.00 | 9.74 |
| Cobalt | 7.00–9.00 | 7.50–8.50 | 7.78 |

Remainder substantially all iron.

In the foregoing table it will be seen that the range of each chemical element is relatively limited. However, any number of steels can be prepared within this range and can be heat treated to give the ultra hard high speed steels of the present invention. The elements silicon, manganese, sulfur and phosphorus are not critical elements and can be omitted entirely. However, it is preferable to have a fraction of a percent of silicon and manganese present in the steel.

FIGURE 1 shows the master tempering (time-temperature) curve obtained by varying carbon content in a selected base analysis, that is to say, the base analysis in each case was the same as the base analysis given for the specific steel in Table I and the carbon content was varied from about 0.84 to about 1.14. In the tests shown in FIGURE 1, the steels were austenitized at a temperature of 2200° F. (that is, heated to this temperature and quenched). They were then reheated or tempered over a relatively wide range from 300° F. to 1300° F. and hardness determinations were made on the various tempered specimens. The optimum hardness occurred between 850° F. and 1100° F.

From FIGURE 1 it will be seen that tempering temperatures of 965° F. to 1000° F. achieve over 70 Rockwell "C" hardness after triple or quadruple tempering. It will also be noted that a tempering temperature of 1100° F. still gives a hardness of 65 Rockwell "C" which is equivalent to the standard high speed steel grades. Thus, the new steels of the present invention can be tempered about 75° F. higher than the standard high speed steel for the same hardening level, thereby giving an additional 75° F. in resistance to the softening effect of heat during cutting.

When heat treating the steels of the present invention to the highest hardness range it is preferred that an austenitizing temperature of 2200° F. be applied and that the tools be subjected to four tempering cycles at 950° F. to 965° F. for 2+2+2+2 hours at this temperature range. The four temperings are especially beneficial in giving the proper balance of properties when using these steels at Rockwell "C" 69–70.

Data from the curves in FIGURE 1 is replotted against the carbon content in FIGURE 2 for several selected tempering temperatures. It will be noted that the peak hardening response is attained at approximately 1.08% carbon. Steels having higher carbon contents also hardened satisfactorily but the impact toughness decreased.

FIGURE 3 is a similar plot, also derived from master tempering curves, showing the effect of cobalt content on hardening response of the base analysis. The accompanying effect of cobalt content on impact hardness at several hardness levels is shown in FIGURE 4. It will be noted that an increase in cobalt from 5% to 8% by weight caused very little loss in toughness, while FIGURE 3 shows a significant increase in hardening ability within this range. At approximately 8% by weight cobalt there is an optimum combination of hardness and toughness.

FIGURE 5 shows a plot from several series of studies on the effect of tungsten and molybdenum on hardening response and toughness. Using the substitution of 0.50% molybdenum as the equivalent of 1% tungsten, several "tungsten equivalents" were investigated by maintaining the total (tungsten plus 2 times molybdenum) at 19.0, 20.5 and 22.0, while varying tungsten and molybdenum within the formula. The tungsten equivalent of W+2Mo =20.5 provided the best combination of hardening and toughness. Up to 1.5% tungsten within this formula afforded the best grain refinement, without the loss of toughness accompanying higher tungsten contents.

Figure 6:
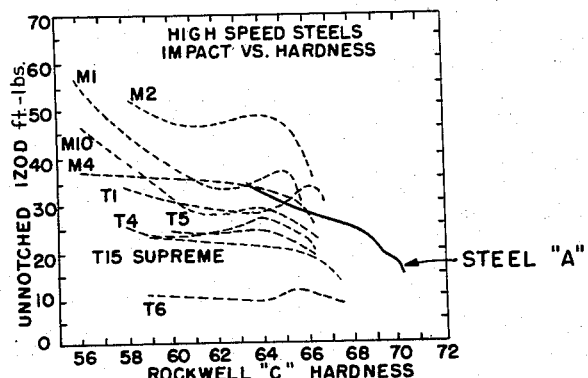
FIGURE 6 shows the relationship of toughness versus hardness in Steel A as compared with other steels.

As shown by FIGURE 6, the toughness of the steels of the present invention is remarkably high for its hardening ability. In fact, when tempered back to the 65 Rockwell "C" range of standard high speed steels, its toughness compares favorably with M1, M10 and T1 and falls considerably above the other cobalt steels T4, T15 and T6. Even at high working hardness levels at 68–70 Rockwell "C" its toughness compares favorably with other high alloy grades such as T15 and T6.

Retained austenite studies, shown in Table II, indicate the progressive conditioning and transformation of retained austenite during multiple tempering of steel "A."

*Table II.—Effect of tempering on retained austenite in optimum analysis*

| Number of tempers at 965° F.: | Percent retained austenite |
| --- | --- |
| As quenched | 24.0 |
| Single 2 hour temper | 16.1 |
| Double 2+2 hour temper | 4.7 |
| Triple 2+2+2 hour temper | 2.7 |
| Quadruple 2+2+2+2 hour temper | 1.7 |

In the as-hardened condition, this steel contains an appreciable amount of austenite, resulting in relatively low hardness levels of 62–65 Rockwell "C." However, during tempering, the austenite transforms to tempered martensite, leaving low residuals of only 2.7% after triple tempering, and 1.7% after quadruple tempering. Although the hardening mechanism has not yet been fully studied, it appears that the particular combination of alloying elements in this steel causes the secondary hardening peak from transformation of retained austenite to coincide almost exactly with the peak from precipitation of the alloy carbides Mo$_2$C and VC, thus providing maximum hardening in the 950° F.–1000° F. peak range.

Due to its high hardness and good tempering resistance, this steel exhibits exceptional hot hardness. Table III compares the hot hardness of standard high speed steel, a super wear resisting T15 type, and this analysis at 1000° F.

*Table III.—Hot hardness of representative high speed steels*

[Tested at 1000° F.]

| Standard High Speed Steel (M1, M2) | High Vanadium High Speed Steel (T15, M4) | Rockwell "C" 70 High Speed Steel (Steel "A") |
| --- | --- | --- |
| 525 DPH [1] (51 Rc) | 575 DPH (54 Rc) | 655 DPH. (58 Rc). |

[1] Diamond Pyramid Hardness.

In high speed steels, wear resistance at cutting temperatures is a function of both hot hardness and abrasion resistance. The latter property, which Gill maximized by vanadium additions in T15, M15, and M4, is accompanied by reduced grindability in tool manufacture. Preliminary cutting tests with various carbide forming additions to this base analysis indicated more than adequate elevated temperature wear resistance at 1% vanadium, with a distinct grindability advantage at this level for avoidance of damage in tool manufacture, as shown by Table IV.

*Table IV.—Comparative grindability of some high hardness high speed steels*

| Type: | Relative grindability |
| --- | --- |
| Standard M1 | 8.0 |
| Steel "A" | 5.6 |
| M1+8 Co+1% V | 2.2 |
| M2+5 Co | 1.5 |
| M2+12 Co | 0.95 |
| Standard T15 | 0.62 |

Test specimens: M1 at 65 Rockwell "C," T15 at 66 Rockwell "C," and other steels at 68–69 Rockwell "C," wet ground with soluble oil, using a 60 grit wheel of Specification No. 32A60H8VBE.

Figure 7:
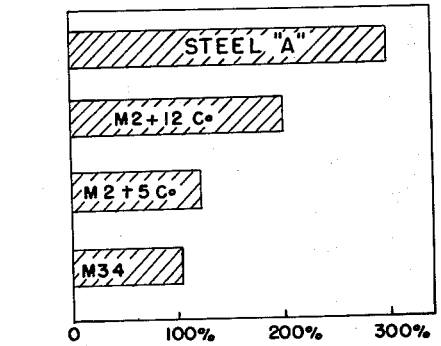
FIGURE 7 shows the comparative tool life of Steel A and other steels.

FIGURE 7 shows the comparative tool life of steel "A" of the present invention with other steels in end milling AISI 4130 at 250 BHN using a feed of 5.75 inch per minute; a speed of 660 revolutions per minute and a cut of 0.5 inch by 0.050 inch. It will be observed that the steel of the present invention was approximately 100% better than the closest comparative steel. The M2 grade of steel with 12% cobalt added contains 0.85% carbon, 0.30% manganese, 0.30% silicon, 4.00% chromium, 2.00% vanadium, 6.00% tungsten, 5.00% molybdenum and 12.00% cobalt. The M34 steel contains 0.90% carbon, 0.30% manganese, 0.30% silicon, 4.00% chromium, 2.00% vanadium, 1.50% tungsten, 8.50% molybdenum and 8.00% cobalt. This steel, despite the fact that it contained the same amount of cobalt, the same amount of tungsten, slightly more chromium, about 1% less molybdenum, 20% less carbon, and 0.85% more vanadium, gave a comparative tool life 200% less than the steel of the present invention. For the chemical compositions of the steels referred to herein, reference is made to "Tool Steels," Third Edition, by Roberts, Hamaker and Johnson, published by The American Society for Metals, 1962.

Other examples of specific steels which are within the scope of the invention are those having the following compositions in approximate percentages by weight:

|  | B | C | D |
| --- | --- | --- | --- |
| Carbon | 1.10 | 1.09 | 1.10 |
| Silicon | 0.26 | 0.23 | 0.23 |
| Manganese | 0.27 | 0.24 | 0.26 |
| Sulfur | 0.007 | 0.003 | 0.006 |
| Phosphorus | 0.012 | 0.012 | 0.013 |
| Tungsten | 1.51 | 1.53 | 1.51 |
| Chromium | 3.82 | 3.76 | 3.91 |
| Vanadium | 1.20 | 1.24 | 1.18 |
| Molybdenum | 9.75 | 9.25 | 9.45 |
| Cobalt | 7.84 | 7.98 | 8.05 |

Remainder substantially all iron.

The steels designated "B," "C" AND "D" have similar properties to Steel "A."

From the foregoing description it will be seen that the ultra high speed steels of the present invention achieved 69–70 Rockwell "C" hardness, whereas standard high speed steels like M2, M1, M10, M7, M3, and T1 reach 65–66 Rockwell "C," and the super wear resisting T15 and M15 types achieve 67–68 Rockwell "C." From the standpoint of cutting ability, hardness gains of 1 or 2 Rockwell "C" in the 65–70 Rockwell "C" range are much more significant than similar changes at lower hardness levels. Furthermore, the Rockwell "C" 70 steel exhibits toughness that is exceptionally high for its hardening ability, grindability approaching that of standard high speed steels, and hot hardness and resistance to softening surpassing most other grades.

In addition to exceptional hardness, satisfactory hot hardness, wear resistance and toughness, the steels of the present invention also have the necessary tool manufacturing factors including machinability, ease of heat treatment, and grindability.

These steels are especially useful when employed in tools for machining heat treated high strength steels and titanium alloys, as well as the heat resisting super alloys where the greater hardness differential between the tool and the work piece provides a significant advantage. In this respect, the steels of the present invention supplement the T15, M15 and M4 super wear resistant types. Their high hot hardness also suggests usefulness in certain application for normal cutting operations on softer materials. Furthermore, they are manufactured into cutting tools with comparative ease and the steels themselves are relatively low cost products.

The invention is hereby claimed as follows:

1. In an alloy steel which is capable of being hardened by tempering to a Rockwell "C" harness of 69–70 with satisfactory hot hardness, wear resistance, grindability, toughness and machinability suitable for use in making cutting tools for machining heat treated high strength steels and titanium alloys, the combination of the following weight percentages of:

| | |
|---|---|
| Carbon | 1.00–1.20 |
| Silicon | 0–1.00 |
| Manganese | 0–1.00 |
| Sulfur | 0–0.25 |
| Phosphorus | 0–0.25 |
| Tungsten | 1.00–2.00 |
| Chromium | 3.00–5.00 |
| Vanadium | 0.75–1.50 |
| Molybdenum | 8.50–10.50 |
| Cobalt | 7.00–9.00 | with the remainder being substantially all iron.

2. In an alloy steel which is capable of being hardened by tempering to a Rockwell "C" hardness of 69–70 with satisfactory hot hardness, wear resistance, grindability, toughness and machinability suitable for use in making cutting tools for machining heat treated high strength steels and titanium alloys, the combination of the following weight percentages of:

| | |
|---|---|
| Carbon | 1.07–1.13 |
| Silicon | 0–0.50 |
| Manganese | 0–0.50 |
| Sulfur | 0–0.15 |
| Phosphorus | 0–0.15 |
| Tungsten | 1.25–1.75 |
| Chromium | 3.25–4.25 |
| Vanadium | 1.00–1.30 |
| Molybdenum | 9.00–10.00 |
| Cobalt | 7.50–8.50 | with the remainder being substantially all iron.

3. In an alloy steel which is capable of being hardened by tempering to a Rockwell "C" hardness of 69–70 with satisfactory hot hardness, wear resistance, grindability, toughness and machinability suitable for use in making cutting tools for machining heat treated high strength steels and titanium alloys, the combination of the following approximate weight percentages of:

| | |
|---|---|
| Carbon | 1.09 |
| Silicon | 0.25 |
| Manganese | 0.25 |
| Sulfur | 0.027 |
| Phosphorus | 0.018 |
| Tungsten | 1.45 |
| Chromium | 3.86 |
| Vanadium | 1.17 |
| Molybdenum | 9.74 |
| Cobalt | 7.78 | with the remainder being substantially all iron.

4. In an alloy steel which is capable of being hardened by tempering to a Rockwell "C" hardness of 69–70 with satisfactory hot hardness, wear resistance, grindability, toughness and machinability suitable for use in making cutting tools for machining heat treated high strength steels and titanium alloys, the combination of the following approximate weight percentages of:

| | |
|---|---|
| Carbon | 1.10 |
| Silicon | 0.26 |
| Manganese | 0.27 |
| Sulfur | 0.007 |
| Phosphorus | 0.012 |
| Tungsten | 1.51 |
| Chromium | 3.82 |
| Vanadium | 1.20 |
| Molybdenum | 9.75 |
| Cobalt | 7.84 | with the remainder being substantially all iron.

5. In an alloy steel which is capable of being hardened by tempering to a Rockwell "C" hardness of 69–70 with satisfactory hot hardness, wear resistance, grindability, toughness and machinability suitable for use in making cutting tools for machining heat treated high strength steels and titanium alloys, the combination of the following weight percentages of:

| | |
|---|---|
| Carbon | 1.09 |
| Silicon | 0.23 |
| Manganese | 0.24 |
| Sulfur | 0.003 |
| Phosphorus | 0.012 |
| Tungsten | 1.58 |
| Chromium | 3.76 |
| Vanadium | 1.24 |
| Molybdenum | 9.25 |
| Cobalt | 7.98 | with the remainder being substantially all iron.

6. In an alloy steel which is capable of being hardened by tempering to a Rockwell "C" hardness of 69–70 with satisfactory hot hardness, wear resistance, grindability, toughness and machinability suitable for use in making cutting tools for machining heat treated high strength steels and titanium alloys, the combination of the following weight percentages of:

| | |
|---|---|
| Carbon | 1.10 |
| Silicon | 0.23 |
| Manganese | 0.26 |
| Sulfur | 0.006 |
| Phosphorus | 0.013 |
| Tungsten | 1.51 |
| Chromium | 3.91 |
| Vanadium | 1.18 |
| Molybdenum | 9.45 |
| Cobalt | 8.05 | with the remainder being substantially all iron.

7. A cutting tool formed from an alloy steel having a Rockwell "C" tempered hardness of 69–70, satisfactory hot hardness, toughness, wear resistance and machinability, said tool having the following approximate chemical composition:

| | |
|---|---|
| Carbon | 1.00– 1.20 |
| Silicon | 0 – 1.00 |
| Manganese | 0 – 1.00 |
| Sulfur | 0 – 0.25 |
| Phosphorus | 0 – 0.25 |
| Tungsten | 1.00– 2.00 |
| Chromium | 3.00– 5.00 |
| Vanadium | 0.75– 1.50 |
| Molybdenum | 8.50–10.50 |
| Cobalt | 7.00– 9.00 | with the remainder being substantially all iron.

8. The process of preparing an ultra hard high speed steel which comprises quenching from the austenitic range a steel having the following chemical composition:

| | |
|---|---|
| Carbon | 1.00– 1.20 |
| Silicon | 0  – 1.00 |
| Manganese | 0  – 1.00 |
| Sulfur | 0  – 0.25 |
| Phosphorus | 0  – 0.25 |
| Tungsten | 1.00– 2.00 |
| Chromium | 3.00– 5.00 |
| Vanadium | 0.75– 1.50 |
| Molybdenum | 8.50–10.50 |
| Cobalt | 7.00– 9.00 | with the remainder being substantially all iron, and tempering the quenched steel to give a Rockwell "C" hardness of 69–70.

9. A process as claimed in claim 8 in which the steel is austenitized at approximately 2200° F. and reheated several times at a temperature between 900° F. and 1100° F. until the Rockwell "C" hardness is 69–70.

10. A process as claimed in claim 8 in which the steel is austenitized at approximately 2200° F. and subjected to four temperature cycles at 950° F. to 965° F. for approximately 2+2+2+2 hours at this temperature until the Rockwell "C" hardness is 69–70.

References Cited by the Examiner
UNITED STATES PATENTS

| | | | |
|---|---|---|---|
| 2,185,006 | 12/1939 | Welch et al. | 75—126 |
| 2,265,973 | 12/1941 | Cohen | 148—144 X |
| 3,012,879 | 12/1961 | Schempp et al. | 75—126 |
| 3,113,862 | 12/1963 | Harvey et al. | 75—126 |

DAVID L. RECK, *Primary Examiner.*

HYLAND BIZOT, *Examiner.*

C. N. LOVELL, *Assistant Examiner.*